US012541192B2

United States Patent
Joshi et al.

(10) Patent No.: US 12,541,192 B2
(45) Date of Patent: *Feb. 3, 2026

(54) OPERATOR DISPLAY SWITCHING PREVIEW

(71) Applicant: FISHER-ROSEMOUNT SYSTEMS, INC., Round Rock, TX (US)

(72) Inventors: Prashant Joshi, Leicester (GB); Julian K. Naidoo, Cedar Park, TX (US); Daniel R. Strinden, Austin, TX (US); Cristopher Ian Sarmiento Uy, Metro Manila (PH); Duncan Trevor Schleiss, Austin, TX (US); Molly Marie Firkins, Cedar Park, TX (US); Cindy A. Scott, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/722,791

(22) Filed: Oct. 2, 2017

(65) Prior Publication Data

US 2018/0088565 A1  Mar. 29, 2018

Related U.S. Application Data

(63) Continuation-in-part of application No. 15/243,176, filed on Aug. 22, 2016, now Pat. No. 10,444,739.

(51) Int. Cl.
  *G05B 19/418* (2006.01)
  *G05B 23/02* (2006.01)
(52) U.S. Cl.
  CPC ... *G05B 19/41875* (2013.01); *G05B 23/0267* (2013.01); *G05B 2219/14064* (2013.01);
  (Continued)

(58) Field of Classification Search
  None
  See application file for complete search history.

(56) References Cited

U.S. PATENT DOCUMENTS 5,507,026 A     4/1996  Fukushima et al.
6,067,477 A  *  5/2000  Wewalaarachchi .. G05B 19/418
                                                    700/83

(Continued)

FOREIGN PATENT DOCUMENTS

CN      102326128 A     1/2012
CN      104049594 A     9/2014

(Continued)

OTHER PUBLICATIONS

Search Report for Application No. GB1815506.9, dated Mar. 15, 2019.

(Continued)

*Primary Examiner* — Christopher E. Everett
*Assistant Examiner* — Istiaque Ahmed
(74) *Attorney, Agent, or Firm* — MARSHALL, GERSTEIN & BORUN LLP

(57) ABSTRACT

Techniques for previewing an operator display of a process section in a process plant include presenting a process section on a user interface device, where the process section includes a user control for presenting and/or displaying another process section on the process plant display. In response to receiving user input indicative of a request to display a preview of the other process section via the user control, the user interface device presents the other process section while simultaneously presenting the process section in a preview mode. The process sections in the preview mode may be presented side-by-side, above and below each other, in separate display windows, etc.

16 Claims, 12 Drawing Sheets

(52) U.S. Cl.
CPC .............. *G05B 2219/31469* (2013.01); *G05B 2219/32128* (2013.01); *G05B 2219/45103* (2013.01); *Y02P 90/02* (2015.11)

(56) References Cited

U.S. PATENT DOCUMENTS

| | | | |
|---|---|---|---|
| 10,139,812 | B2 | 11/2018 | Jones et al. |
| 10,514,768 | B2 | 12/2019 | Naidoo et al. |
| 2008/0170271 | A1 | 7/2008 | Lee |
| 2008/0244449 | A1* | 10/2008 | Morrison ............. G05B 19/409 715/810 |
| 2009/0157200 | A1 | 6/2009 | Hams |
| 2010/0017746 | A1* | 1/2010 | Husoy .................. G06F 3/0484 715/781 |
| 2010/0088627 | A1* | 4/2010 | Enkerud ............... G06F 3/0484 715/802 |
| 2010/0138773 | A1* | 6/2010 | Schechter ............... G06F 9/451 715/779 |
| 2010/0146012 | A1 | 6/2010 | Beaudreau et al. |
| 2011/0238375 | A1* | 9/2011 | Fujisaki ............. G05B 23/0267 702/184 |
| 2012/0078869 | A1* | 3/2012 | Bellville ................. G06F 16/90 707/706 |
| 2012/0259436 | A1 | 10/2012 | Resurreccion et al. |
| 2014/0074273 | A1 | 3/2014 | Mohideen et al. |
| 2014/0075392 | A1 | 3/2014 | Timsjo et al. |
| 2014/0351767 | A1* | 11/2014 | Linder ................ G06F 3/04812 715/856 |
| 2015/0293683 | A1* | 10/2015 | Horsman ................ G06F 9/451 715/765 |
| 2016/0042541 | A1 | 2/2016 | Nixon et al. |
| 2016/0328133 | A1 | 11/2016 | Kim et al. |

FOREIGN PATENT DOCUMENTS

| | | |
|---|---|---|
| CN | 104049597 A | 9/2014 |
| CN | 106020138 A | 10/2016 |
| CN | 107193263 A | 9/2017 |
| EP | 3 156 871 A1 | 4/2017 |
| GB | 2 554 169 A | 3/2018 |
| GB | 2513000 B | 12/2020 |
| GB | 2513709 B | 6/2021 |
| JP | H07-271429 A | 10/1995 |
| JP | H08-063317 A | 3/1996 |
| JP | H08-161029 A | 6/1996 |
| JP | 2000-347721 A | 12/2000 |
| JP | 2005-055965 A | 3/2005 |
| JP | 2007-323396 A | 12/2007 |
| JP | 2008-108265 A | 5/2008 |
| JP | 2008-305138 A | 12/2008 |
| JP | 2011-118493 A | 6/2011 |
| JP | 2011-154429 A | 8/2011 |
| JP | 2012-174128 A | 9/2012 |
| JP | 2012-198782 A | 10/2012 |
| JP | 2013-041401 A | 2/2013 |
| JP | 2013-131018 A | 7/2013 |
| JP | 2016-100846 A | 5/2016 |
| JP | 2017-059131 A | 3/2017 |
| KR | 10-2008-0066124 A | 7/2008 |

OTHER PUBLICATIONS

Notification of Reason for Rejection for Japanese Application No. 20174-157574, dated Jul. 29, 2021.
Notification of the First Office Action for Chinese Application No. 201710723379.2, dated Aug. 23, 2021.
Examination Report for Application No. GB1712874.5, dated Sep. 30, 2021.
Examination Report for Application No. GB1815506.9, dated Feb. 10, 2022.
Notification of the Second Office Action for Chinese Application No. 201710723379.2, dated Feb. 8, 2022.
Examination Report for Application No. GB1712874.5, dated Apr. 28, 2022.
Office Action, Japanese Patent Application No. 2018-186523, dated Oct. 26, 2022.
Office Action for Chinese Patent Application No. 201811160168.3, dated Nov. 20, 2023.
Japanese Patent Application No. 2023-169131, Notice of Reasons for Refusal, mailing date Aug. 20, 2024.

* cited by examiner

OPERATOR DISPLAY SWITCHING PREVIEW

RELATED APPLICATIONS

This application is a regular filed application that is a Continuation-In-Part of U.S. application Ser. No. 15/243,176, entitled "Operator Display Switching Preview," which was filed on Aug. 22, 2016, the entire disclosure of which is hereby expressly incorporated by reference herein.

FIELD OF THE DISCLOSURE

This disclosure relates generally to process control systems, and, more particularly, to a user interface device which allows an operator to preview a portion of a process plant while simultaneously viewing another portion of the process plant.

BACKGROUND

Distributed process control systems, like those used in chemical, petroleum or other processes, typically include one or more process controllers and input/output (I/O) devices communicatively coupled to at least one host or operator interface and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator interfaces, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. Each of these applications provides a user-interface (UI) to allow a user (e.g., a configuration engineer, an operator, a maintenance technician, etc.) to view and/or modify aspects of the process plant operation and configuration. Throughout this specification, the phrase "user interface" or "UI" is used to refer to an application or screen that allows a user to view or modify the configuration, operation, or status of the process plant. Similarly, the phrase "user-interface device" or "UI device" is used to refer to a device on which a user interface is operating, whether that device is stationary (e.g., a workstation, wall-mounted display, process control device display, etc.) or mobile (e.g., a laptop computer, tablet computer, smartphone, etc.). A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system engineers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

In some known systems, a UI depicts a process section which represents a portion of a process plant. To view other portions of the process plant, an off-sheet connector may be included on the UI which indicates a connection to another process section that is not included on the currently displayed UI. When an operator selects the off-sheet connector, the current UI may be replaced with a new UI that depicts the other process section. For example, a UI depicts a process section for a crude oil heater which includes an off-sheet connector. When the off-sheet connector is selected, another UI is presented which depicts a process section for a crude oil tower.

In this manner, the UI completely changes without including overlap between the process sections in the displays. As a result, an operator is required to re-orient herself each time a new UI is presented. The operator may need to remember the previous UI while viewing the new UI including the location of the process section depicted in the previous UI in relation to location of the current process section depicted in the new UI. Accordingly, the operator may need to navigate back and forth between the UIs several times to remember the configuration and/or data for process entities in one process section while viewing the other process section.

SUMMARY

A user interface device presents a display screen having a user control, such as a search tool, navigation bar or off-sheet connector, which allows a user to preview a process section (the "previewed process section") depicting a portion of a process plant, and/or the status of the portion of the process plant, while simultaneously observing a currently viewed process section (the "viewed process section") depicting another portion of the process plant. In some embodiments, the previewed process section is connected to the viewed process section in the process plant. For example, the output of the viewed process section may feed into the input of the previewed process section. In other embodiments, the previewed process section is adjacent to the viewed process section but the process sections are not connected. In still other embodiments, the previewed process section is an unconnected and nonadjacent process section.

In some embodiments, the search tool may provide search results of other process sections, where each of the search result items includes a preview of the corresponding process section. In other embodiments, the navigation bar provides navigation "breadcrumbs" depicting a navigation trail of a hierarchical structure in the process plant, with previewed process sections corresponding to process sections within the navigation trail and/or in a hierarchal level within the navigation trail. In yet other embodiments, selection of an off-sheet connection results in a preview of one or more status indicators for the previewed process section corresponding to the off-sheet connector.

The user interface device may be connected to on-line process measurements as well as the on-line process plant entities such that the status (e.g., alerts, alarms, number of alerts/alarms, etc.) of the previewed process section may be displayed to the operator. In some embodiments, the previewed process section and/or previewed process section status may be presented in a window overlaying the display of the viewed process section on the display screen and/or adjacent or proximate the user control.

The user interface device may also include a user control for switching from preview mode to full view mode and selecting the process section to view in the full view mode. The full view mode may include a complete display of only one of the process sections. For example, the operator may tap, double tap, tap and hold, drag, click, double click, click and hold, click and drag, etc., on the previewed process section to view the previewed process section in full view mode. In response to receiving the input from the operator, the previewed process section may be displayed on the entire display screen without including the viewed process section. In another example, the operator may tap, double tap, tap and hold, click, double click, click and hold, etc., on the viewed process section to revert back to the full view mode for the viewed process section.

DETAILED DESCRIPTION

Figure 1A:
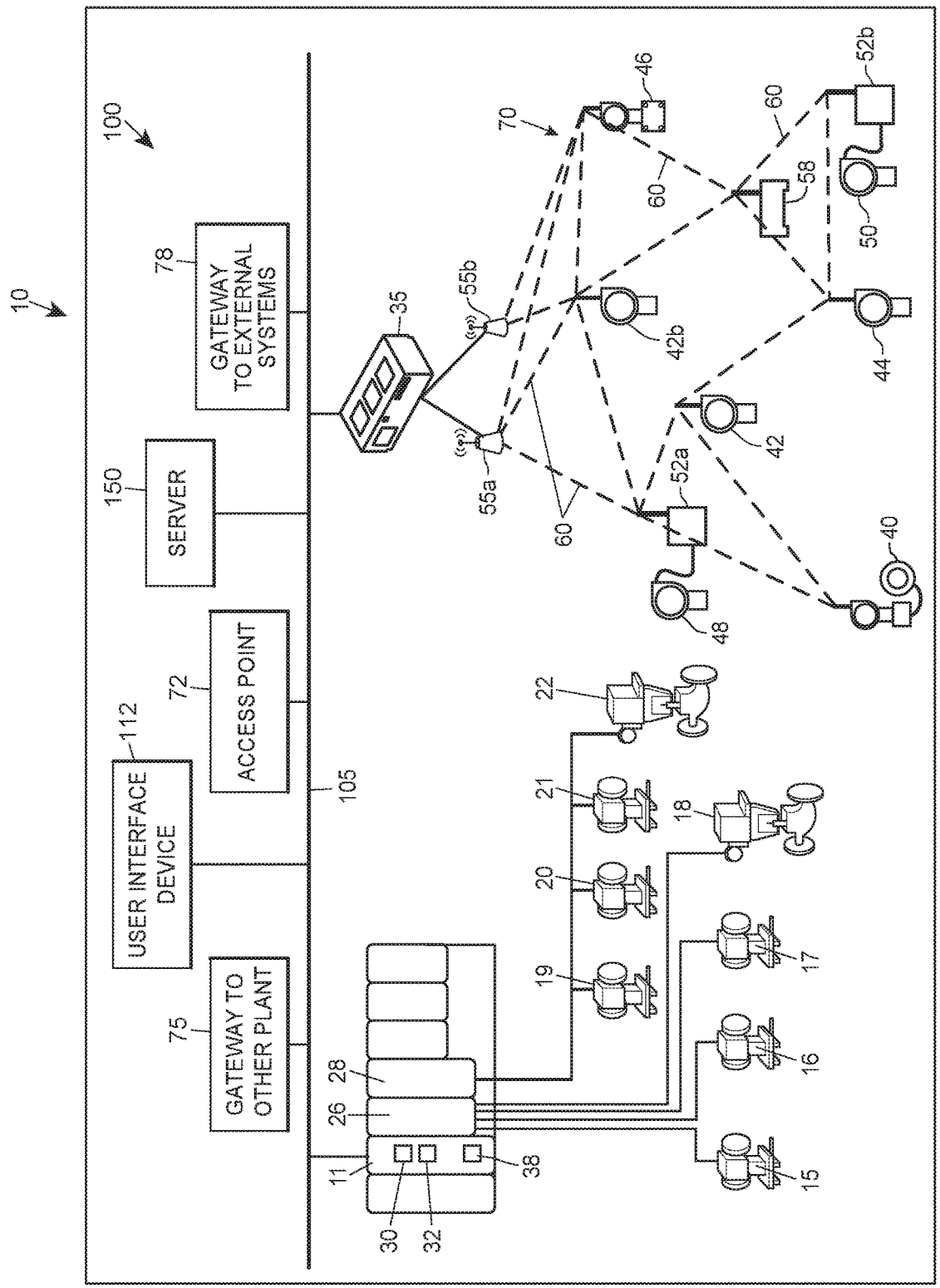
FIG. 1A is a block diagram of a distributed process control network located within a process plant including a user interface device which displays a preview of a process section within a process plant to an operator.

FIG. 1A is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112 which may be stationary (e.g., a traditional operator workstation) or mobile computing devices (e.g., a mobile device smart-phone), servers 150, controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

In certain embodiments, the UI device 112 may implement any type of client, such as a thin client, web client, or thick client. For example, the UI device 112 may depend on other nodes, computers, UI devices, or servers for the bulk of the processing necessary for operation of the UI device 112, as might be the case if the UI device is limited in memory, battery power, etc. (e.g., in a wearable device). In such an example, the UI device 112 may communicate with the server 150 or with another UI device, where the server 150 or other UI device may communicate with one or more other nodes (e.g., servers) on the process control network 100 and may determine the display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. For example, the UI device 112 may execute the previously discussed UI. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider devices may include one or more gateways 75, 78 to systems that are external to the immediate process control system. In such embodiments, the UI device 112 may be used to control, monitor, or otherwise communicate with said external systems. Typically, such systems are customers or suppliers of information generated or operated on by the process control system. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home).

Although FIG. 1A illustrates a single controller 11 with a finite number of field devices 15-22 and 40-46, this is only an illustrative and a non-limiting embodiment. Any number of controllers 11 may be included in the provider devices of the process control network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communication networks 70, access points 72, and/or gateways 75, 78.

Figure 1B:
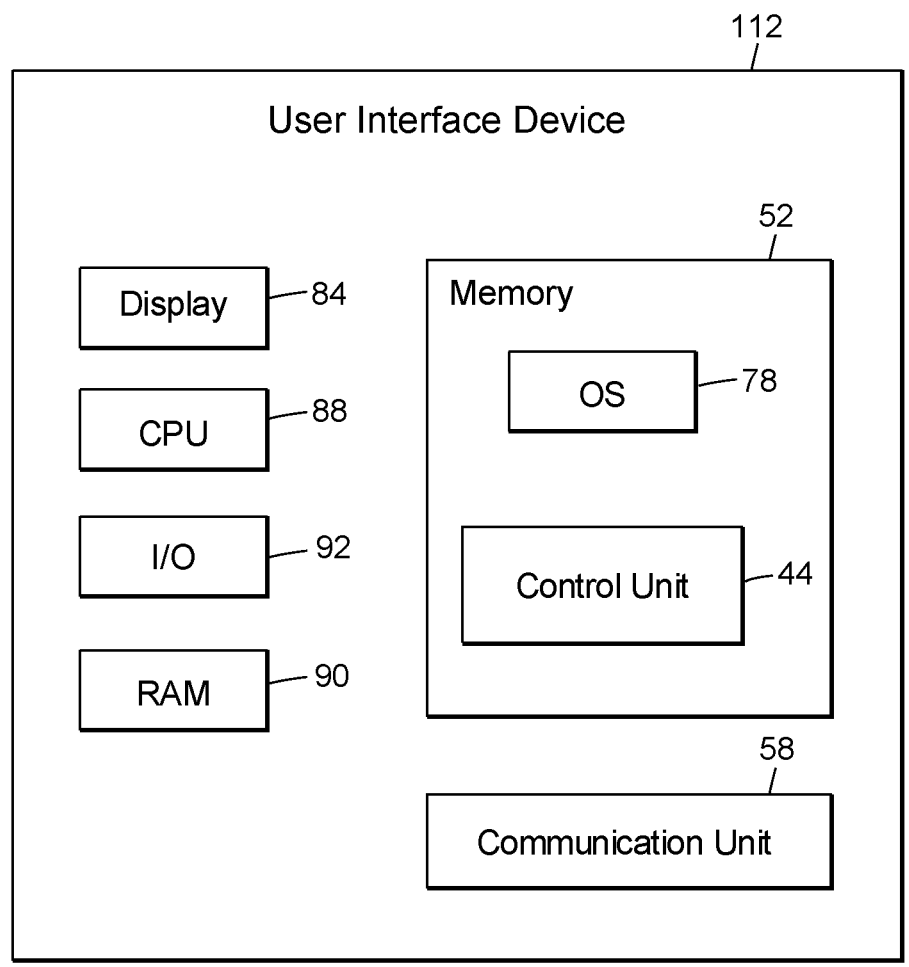
FIG. 1B is a block diagram of an example user interface device schematically illustrated in FIG. 1A.

FIG. 1B illustrates a block diagram of an example UI device 112. The UI device 112 may be a desktop computer such as a traditional operator workstation, a control room display, or a mobile computing device such as a laptop computer, a tablet computer, a mobile device smart-phone, a personal digital assistant (PDA), a wearable computing device, or any other suitable client computing device. The UI device 112 may include a display 84. Further, the UI device 112 includes one or more processors or CPUs 88, a memory 52, a random-access memory (RAM) 90, an input/output (I/O) circuit 92, and a communication unit 58 to transmit and receive data via a local area network, wide area network, or any other suitable network. The UI device 112 may communicate with the controllers 11, the server 150 and/or any other suitable computing device.

The memory 52 may include an operating system 78, and a control unit 44 for controlling the display 84 and communicating with the controllers 11 to control on-line operation of the process plant. In some embodiments, the server 150 may transmit a graphic representation of a portion of the process plant to the UI device 112 and in turn, the control unit 44 may cause the graphic representation of the portion of the process plant to be presented on the display 84. Additionally, the control unit 44 may obtain user input from the I/O circuit 92, such as user input from the operator (also referred to herein as a user) and translate the user input into a request to display a preview of a process section that is not currently being displayed, a request to display a full view of a process section that is not currently being displayed, a request to switch from a preview mode to a full view mode and to display one of the process sections in the full view mode, a request to display an adjustment to a process parameter included in one of the process sections, etc.

In some embodiments, the control unit 44 may communicate the translated user input to the server 150 which may generate and transmit the requested UI to the UI device 112 for display. In other embodiments, the control unit 44 may generate the new UI based on the translated user input and present the new UI on the display 84 of the UI device 112. When the translated user input is a request to display an adjustment to a process parameter included in one of the process sections, the control unit 44 may determine whether the process parameter is locked. If the process parameter is locked, the control unit 44 may not adjust the process parameter and may present a message indicating that the process parameter is locked and cannot be adjusted on the display 84 of UI device 112. If the process parameter is not locked, the control unit 44 may adjust the process parameter value on the display 84 in accordance with the user input from the operator and may provide instructions to the controllers 11 to adjust the process parameter in the process plant. In other embodiments, the control unit 44 may communicate the translated user input to the server 150 which may generate and transmit the adjusted process parameter value to the UI device 112 for display, and provide instructions to the controllers 11 to adjust the process parameter in the process plant.

Figure 2A:
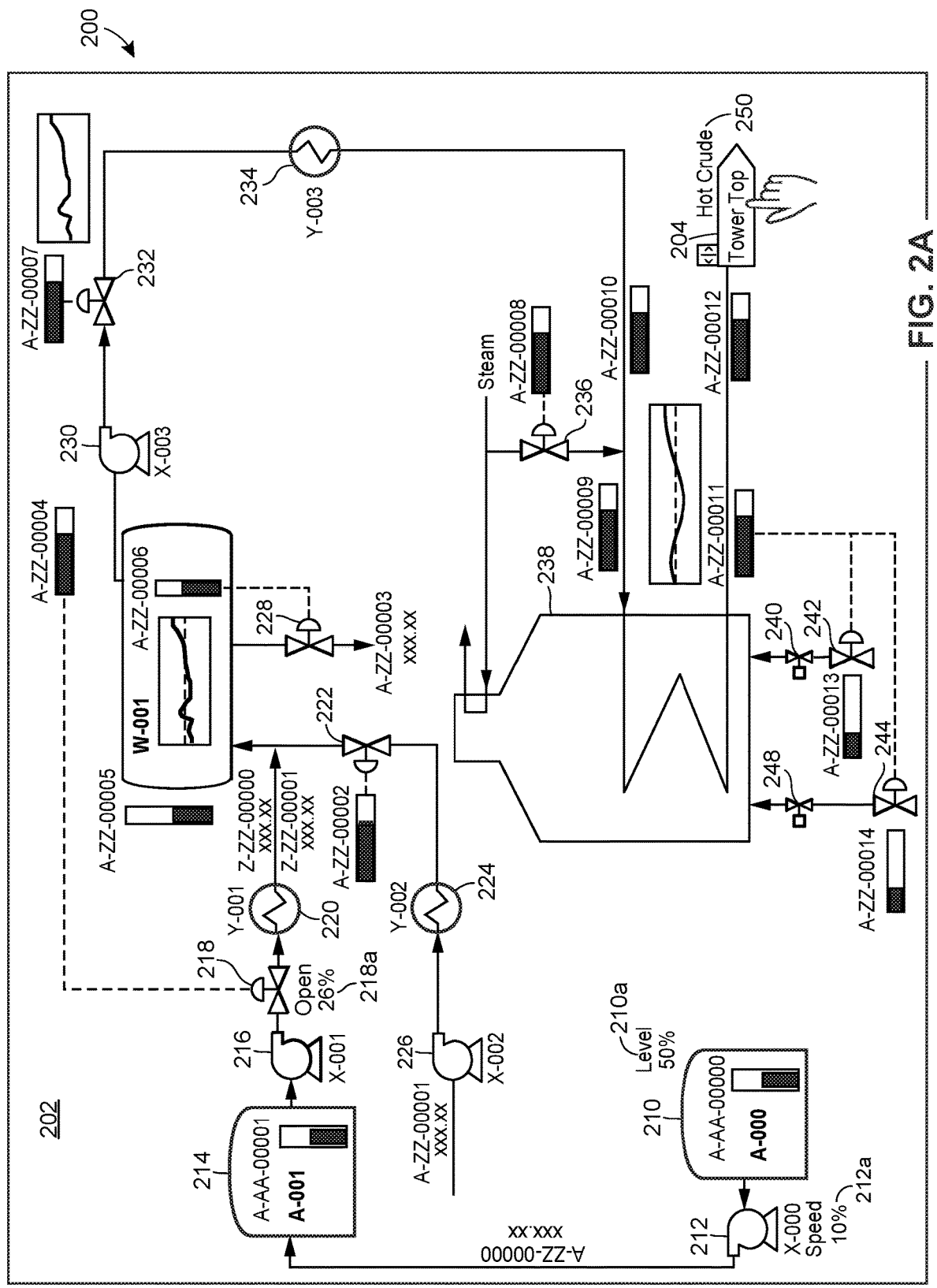
FIG. 2A is a screen display in a full view mode depicting a process section within a process plant and an off-sheet connector.

FIG. 2A illustrates an example screen display 200 in a full view mode depicting a crude oil heater process section 202 within a process plant 10 and an off-sheet connector 204. In some embodiments, the screen display 200 may be presented on the display 84 of the UI device 112. The crude oil heater process section 202 may include graphic representations of process plant entities, connections between the process plant entities, process parameter values, and alarms.

As illustrated in FIG. 2A, the crude oil heater process section 202 includes graphical representations of several process plant entities: two tanks 210, 214, four pumps 212, 216, 226, 230, nine valves 218, 222, 228, 232, 236, 240, 242, 244, 248, four heat exchangers 220, 224, 234, 238 and a hot crude oil output 250. Moreover, the screen display 200 may include process parameter values and alarms associated with the different process plant entities, such as a tank level value 210*a* associated with the tank 210, a pump speed 212*a* associated with the pump 212, and a valve opening percentage 218*a* associated with the valve 218. Set point values may also be displayed along with the process parameter values on the screen display 200. In some embodiments, the operator may adjust the process parameter values and more specifically, the set point values via touch gestures if the display 84 is a touch screen or via mouse clicks.

For example, an operator may tap or click on a graphic representation of a process plant entity and as a result, the screen display 200 may present a faceplate for allowing the operator to adjust a process parameter value for the process plant entity using a slider bar, a graphic representation of a dial, etc. In another example, the operator may perform various touch gestures or mouse clicks on the graphic representation of the process plant entity to adjust a process parameter value for the process plant entity. More specifically, the operator may perform a drag gesture or a click and drag to adjust a tank level value for a tank or a temperature setting for a heat exchanger, may perform a rotate gesture to adjust the speed of a pump, may perform pinch and spread gestures to adjust the valve opening percentage of a valve, etc. While these are merely example gestures and/or mouse clicks which may be used to adjust process parameter values, any suitable gestures or mouse clicks may be used to adjust process parameter values for any suitable process plant entity within the process plant. In yet another example, the operator may type in a new process parameter value via a hardware or software keyboard. The operator may click or tap on the graphic representation of the process plant entity to pull up a dialog box which allows the operator to type in the new process parameter value.

In any event, when the process parameter values reflect actual measurements ("live data") within the on-line process plant 10, the control module 44 may provide instructions to the controller 11 to adjust a process parameter in the on-line process plant to the set point value. On the other hand, when the process parameter values are simulated values, the control module 44 may present the adjusted process parameter values on the screen display 200.

The off-sheet connector 204 is connected to the hot crude oil output 250 and includes an indication of a connection to a tower top process section. In some embodiments, the off-sheet connector 204 may receive user input from the operator and based on the user input, the UI device 112 may display the tower top process section in a full view mode or a preview mode along with the crude oil heater process section. For example, if a user input is received at the off-sheet connector 204, such as a double tap, a double click of a mouse, a tap and hold, a click and hold, etc., the UI device 112 may display the tower top process section in a full view mode, as described in more detail in FIG. 2D. If an alternate user input is received at the off-sheet connector 204, such as a tap, a single click, a slide, a click and drag, a mouse hover, etc., the UI device 112 may display the tower top process section in a preview mode, as described in more detail in FIGS. 2B, 2C, and 3. While these are merely example inputs which may be used to view a process section in the preview or full view modes, any suitable gesture or mouse movement may be provided as user input.

When the operator provides the alternate user input indicating a request to view the tower top process section in a preview mode, the UI device 112 may display the crude oil heater process section 202 or a portion thereof, the tower top process section or a portion thereof, and an intersection between the crude oil heater and tower top process sections.

In some embodiments, the process sections may be displayed side-by-side, above and below each other, or in any other suitable manner. Also in some embodiments, the position of the process sections on the display may be based on the direction that the previewed process section goes off the page. For example, if the previewed process section is located to the right or left of the currently viewed process section on the screen display 200 (or a larger screen display which includes both process sections), the process sections may be displayed side-by-side in the preview mode. If the previewed process section is located above or below the currently viewed process section on the screen display 200 (or a larger screen display which includes both process sections), the process sections may be displayed above and below each other in the preview mode.

Figure 2B:
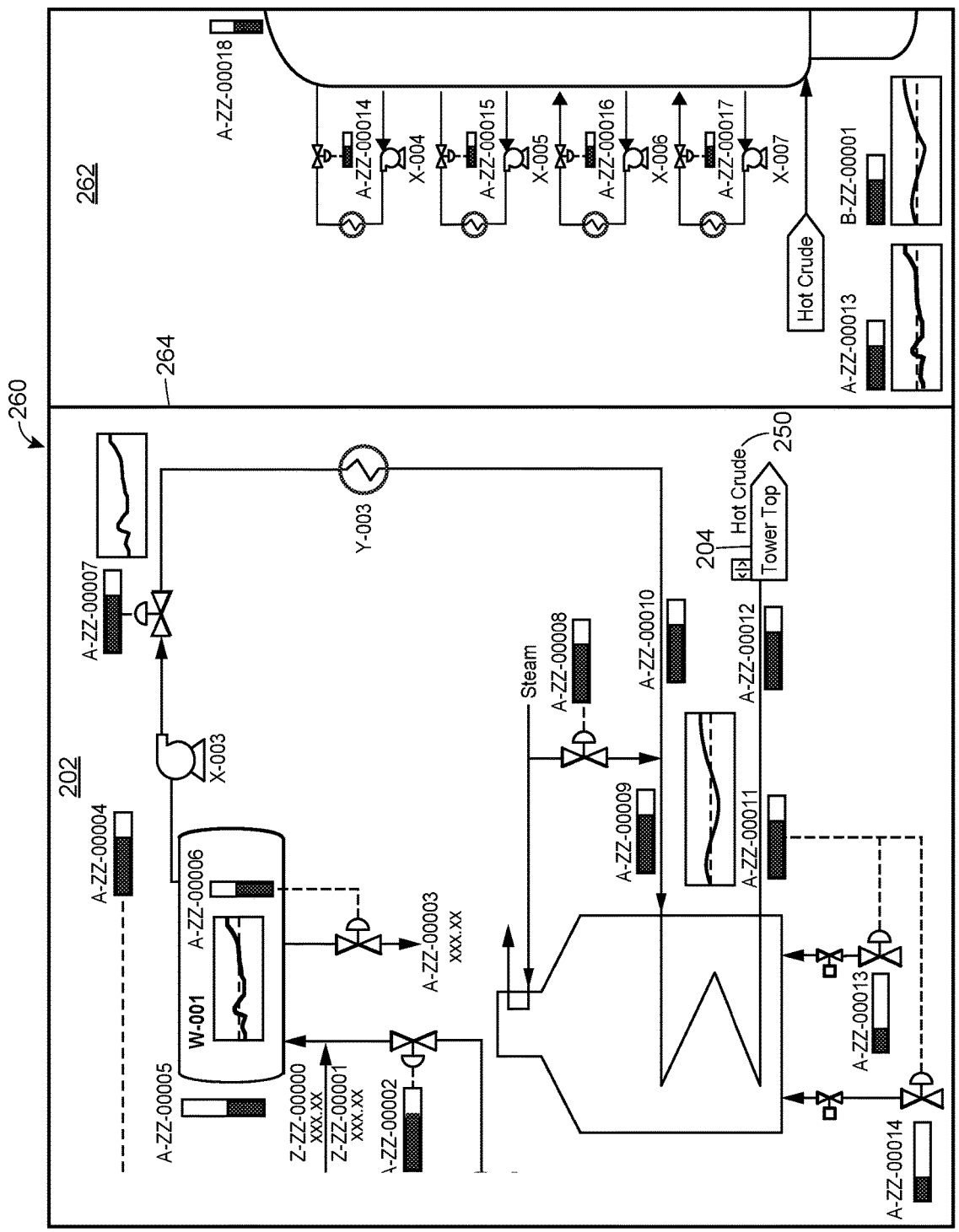
FIG. 2B is a screen display in a preview mode depicting a portion of the process section and a portion of another process section.

FIG. 2B depicts an example screen display 260 in a preview mode depicting a portion 202 of a viewed process section (the crude oil heater process section of FIG. 2A) and a portion 262 of a previewed process section (the tower top process section). In some embodiments, the previewed process section may be an upstream or downstream process section to the process section currently being viewed (the "viewed process section"). A downstream process section may be a process section connected to another process section having an input which is the output of the other process section. An upstream process section may be a process section connected to another process section having an output which is the input of the other process section. For example, the tower top process section 262 may be a downstream process section to the crude oil heater process section 202, because the hot crude oil output of the crude oil heater process section 202 is an input to the tower top process section 262. The off-sheet connector 204 may represent a connection between the hot crude oil output 250 in the crude oil heater process section 202 and the tower top process section 262. In other embodiments, the previewed process section may be adjacent to the viewed process section within the process plant 10, but the process sections may not share a connection.

The screen display 260 further includes an intersection 264 between the viewed process section 202 and the previewed process section 262. The intersection 264 may be a dividing line between the process sections 202, 262 or may be any other suitable boundary separating the process sections 202, 262. As shown in FIG. 2B, to fit both process sections 202, 262 within the screen display 260, a portion of each of the process sections 202, 262 may be included. For example, graphic representations of the process plant entities closest to the intersection for both the viewed and previewed process sections 202, 262 may be included, whereas the graphic representations for the rest of the process plant entities may be removed. More specifically, to fit both process sections 202, 262 in the screen display 260, the screen size for each process section 202, 262 may be reduced by half. Accordingly, the half of each of the process sections 202, 262 farthest from the intersection 262 may be removed (e.g., the left half of the viewed process section 202) and the half of each of the process sections 202, 262 closest to the intersection may remain intact. Additionally or alternatively, the screen size for each process section 202, 262 may be reduced by two-thirds, three-quarters, four-fifths, or by any suitable amount.

In some embodiments, the operator may perform a slide gesture if the display 84 is a touch screen or click and drag a mouse beginning at the location of the off-sheet connector 204 as shown in FIG. 2A or at any other suitable location on the display 84 to request the preview mode. Once the screen display 260 is presented on the UI device 112, the operator may continue to slide or click and drag to adjust the size the amount of screen space for each of the process sections 202, 262. For example, as the operator slides or clicks and drags to the left, the portion of the previewed process section 262 may increase while the portion of the viewed process section 202 may decrease.

Figure 2C:
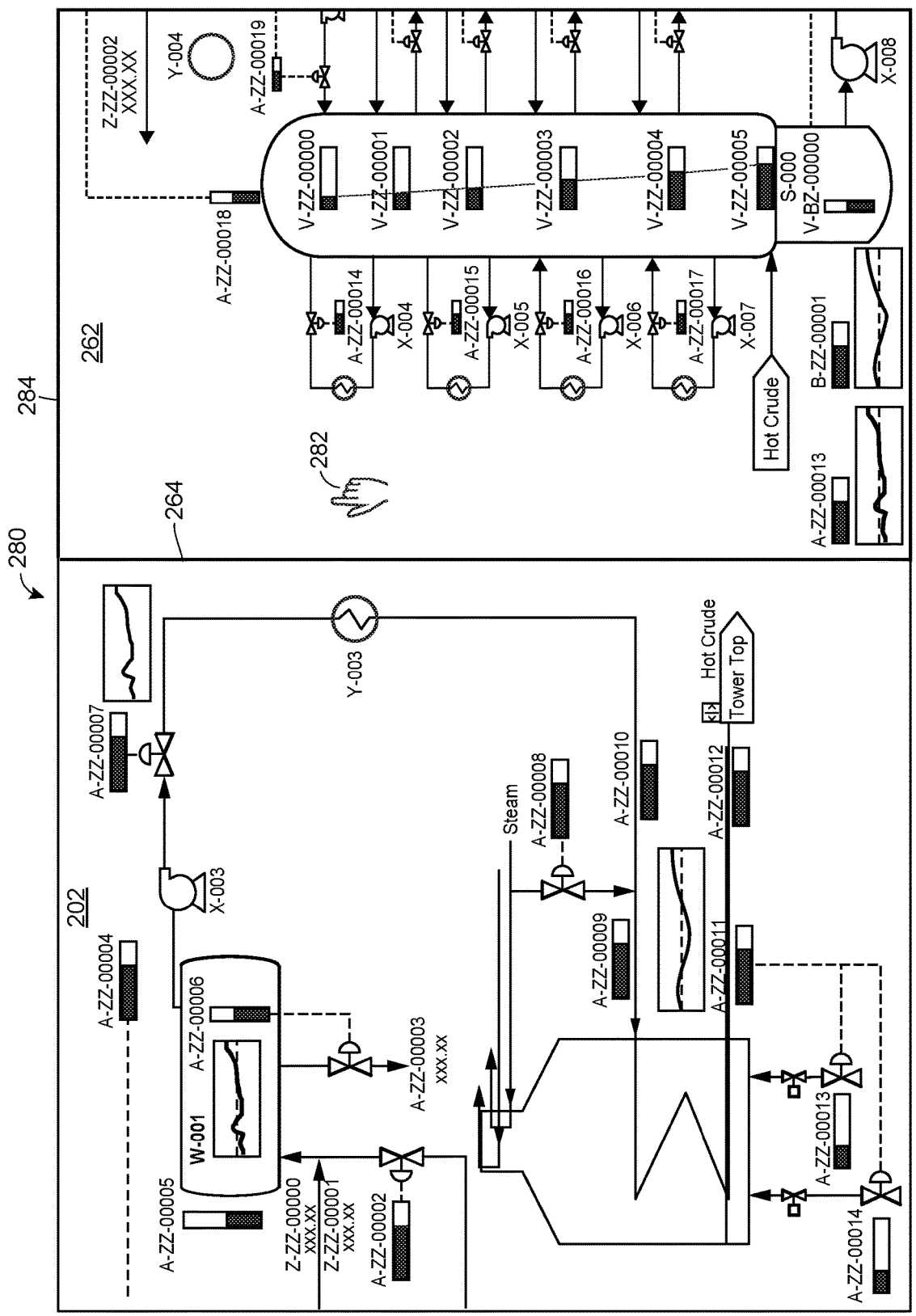
FIG. 2C is the screen display illustrated in FIG. 2B which includes a user control for switching from the preview mode to the full view mode.

For example, turning to FIG. 2C, another screen display 280 is illustrated where the previewed process section 262 takes up a larger amount of the screen display 280 than the viewed process section 202, while the viewed process section 202 takes up a larger amount of the screen display 260 than the previewed process section 262 in FIG. 2B. The difference between the two screen displays 260, 280 may be as a result of the operator sliding or clicking and dragging to the left. In another example, as the operator slides or clicks and drags to the right, the portion of the viewed process section 202 may increase while the portion of the previewed process section 262 may decrease. In other scenarios, the previewed process section 262 may be located to the left of the viewed process section 202, the process sections 202, 262 may be above and beneath each other on the screen display 260 so that the amount of screen space for the process sections 202, 262 increases/decreases as the operator slides or clicks and drags up and down, or may be organized in any other suitable manner. Accordingly, these examples are merely for ease of illustration only and the amount of screen space for each of the process sections 202, 262 may be adjusted in any suitable manner in proportion to the amount the operator slides or clicks and drags.

As mentioned above, each of the process sections 202, 262 may include process parameter values which may be adjusted by the operator, such as a tank level value, a pump speed, a valve opening percentage, a temperature, etc. Accordingly, the screen display 260 may include live data reflecting actual measurements within the on-line process plant 10 for both the viewed process section 202 and the previewed process section 262.

When the user interface device 112 presents a UI in the preview mode such as the screen display 260, the screen display 260 may be locked such that the operator may not adjust process parameter values for the viewed process section 202 or the previewed process section 262. In other embodiments, process parameters for the previewed process section 262 may be locked while process parameters for the viewed process section 202 are not locked. In this manner, the operator may adjust process parameters for the viewed process section 202 while looking at the configuration and/or process parameters for the previewed process section 262. In yet other embodiments, process parameters may not be locked for either of the process sections 202, 262, or process parameters for the viewed process section 202 may be locked while process parameters for the previewed process section 262 may not be locked. In this manner, the operator may adjust process parameters within the previewed process section 262 without fully navigating to a new display. Then after a process parameter within the previewed process section 262 is adjusted, the operator may provide user input causing the viewed process section 202 to return to the full view mode, as described in more detail below with reference to FIGS. 2C and 2D.

While the screen display 260 for the preview mode depicts portions of the viewed process section 202 and the previewed process section 262 to fit both process sections 202, 262, this is merely one exemplary embodiment. In another embodiment, both the viewed process section 202 and the previewed process section 262 may be scaled down to fit within the screen display 260. For example, graphic representations of the process plant entities for the viewed and previewed process sections in a preview mode may be half the size of the graphic representations of the process plant entities in a full view mode. In some embodiments, process plant entities may be scaled down to fit within the screen display while process parameters, alarms, etc., may not be scaled down so that the process parameters, alarms, etc., are viewable for the operator.

Also in some embodiments, the process parameters, alarms, etc., may be prioritized. For example, the server 150 may rank and/or assign priority levels to each of the process parameters, alarms, etc., on the screen display 260 according to importance to an operator, risk of a dangerous condition, or any other suitable metric. In another example, the operator may rank and/or assign priority levels to each of the process parameters, alarms, etc., on the screen display 260. In yet another example, the server 150 may obtain priority levels entered by several operators and use the obtained priority levels to rank and/or assign priority levels to each of the process parameters, alarms, etc., on the screen display 260. Additionally, each process parameter, alarm, etc., on the screen display 260 may be assigned a default ranking and/or priority level. In any event, the process parameters, alarms, etc., which are ranked above a threshold ranking and/or priority level (e.g., three) may not be scaled down, whereas the rest of the process parameters, alarms, etc., on the screen display 260 may be scaled down. In another embodiment, the screen display 260 for the preview mode may depict a portion of the viewed process section 202 and a scaled down version of the previewed process section 262 or vice versa.

While the screen display 260 in the preview mode includes two process sections, a viewed process section and a previewed process section, the preview mode may include any suitable number of process sections. For example, the operator may preview both the upstream and downstream process sections which may be displayed on both sides or above and below the viewed process section in the preview mode. In another example, the operator may preview all of the surrounding process sections which neighbor the viewed process section in the preview mode. This may include two, three, four, five, six, or any suitable number of process sections.

When the operator is in the preview mode, she may want to switch back to the full view mode to view a full display of the viewed process section 202 or the previewed process section 262. FIG. 2C illustrates another screen display 280 in the preview mode similar to the screen display 260 in FIG. 2B and including a user control 282 for switching from the preview mode to the full view mode. As in FIG. 2B, the screen display 280 includes a portion of a viewed process section 202, a portion of a previewed process section 262, and an intersection 264 between the viewed process section 202 and the previewed process section 262.

In some embodiments, the operator may use the user control 282 by controlling a mouse or if the display 84 of UI device 112 is a touch screen, by performing gestures. If the display 84 of UI device 112 is a touch screen, the user control 282 may not be visible on the display screen 280. In any event, the operator may select one of the process sections 202, 262 to display in the full view mode by tapping, clicking, double tapping, double clicking, etc., on the portion of the display screen 280 which corresponds to the desired process section for display in the full view mode. For example, if the operator wants to display the previewed process section 262 in the full view mode, the operator may double tap or double click on the right side of the screen display 280.

In some embodiments, the operator may select one of the process sections 202, 262 as an intermediate step before a process section is displayed in the full view mode. The selected process section may become the primary process section, and as a result, process parameters for the selected process section may be adjustable while process parameters for unselected process sections may be locked.

For example, the operator may click, tap, or hover over the portion of the display screen 280 which corresponds to the selected process section. The screen display 280 may present an indication of the selected process section, for example by placing a bounded box or darkening the borders 284 around the selected process section. The operator may then click or tap a second time to confirm that the selected process section is the process section to display in the full view mode.

A selection of one of the process sections 202, 262 may also provide additional adjustments to the settings of the screen display 280. For example, the selected process section may be assigned a priority level that is higher than the priority level assigned to the unselected process sections. In this manner, the selected process section may become the primary process section.

In an example scenario, at first neither of the process sections 202, 262 on the screen display 280 is selected. As a result, process parameters for both process sections 202, 262 are locked and the operator cannot make any adjustments to the screen display 280 which includes live data for both the viewed process section 202 and the previewed process section 262. When the operator selects the viewed process section 202 by clicking, tapping, or hovering over the viewed process section 202, process parameters for the viewed process section 202 may become adjustable. Then, when the operator selects the previewed process section 262 by clicking, tapping, or hovering over the previewed process section 262, process parameters for the previewed process section 262 may become adjustable while the process parameter for the viewed process section 202 may be locked. When the operator clicks or taps again on the previewed process section 262, the previewed process section 262 may be displayed in a full view mode and the viewed process section 202 may be removed from the display.

Figure 2D:
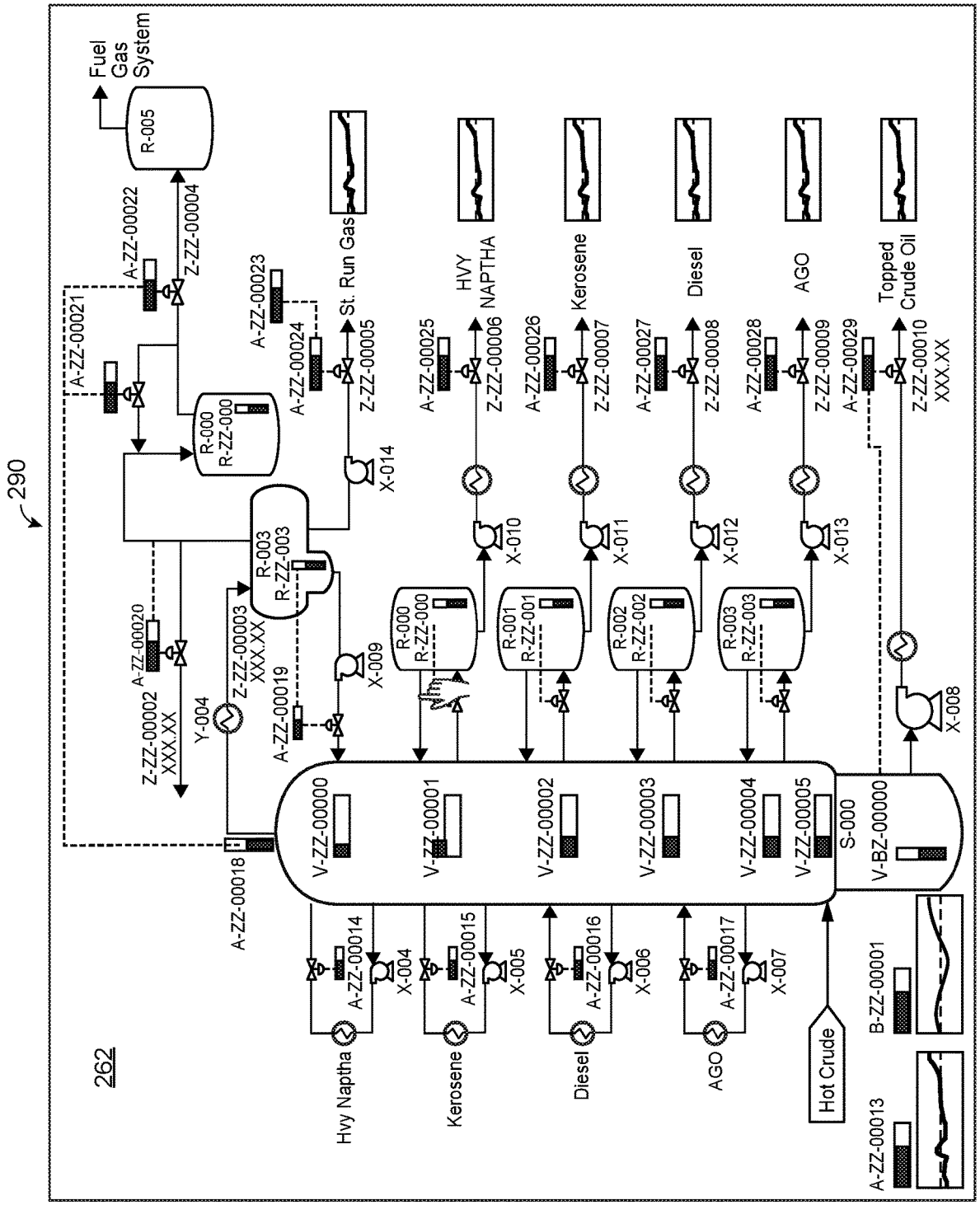
FIG. 2D is a screen display in a full view mode depicting the other process section from the preview mode illustrated in FIG. 2B in response to receiving input from the operator to switch from the preview mode to the full view mode.

FIG. 2D illustrates an example screen display 290 in a full view mode depicting the tower top process section 262. The screen display 290 may be presented on the UI device 112 in response to the operator double clicking, double tapping, or selecting and then clicking or tapping again on the previewed process section 262 as shown in FIG. 2C. As illustrated, the full view mode in the screen display 290 includes the entire tower top process section 262 rather than a portion or a scaled down version of the tower top process section 262, as described above. In some embodiments, the screen display 290 may include an off-sheet connector or other user control (not shown) for selecting another process section in the process plant 10 to display in the preview or full view modes.

In addition to displaying process sections side-by-side or above and below each other in the preview mode, a previewed process section may be displayed in a window overlaying the viewed process section. In some embodiments, the viewed process section may be displayed in a window encompassing the screen display. The previewed process section may be displayed in another window overlaying the viewed process section, where the other window is smaller than the window encompassing the screen display. For example, the other window may be half the size of the window encompassing the screen display, one quarter of the size of the window encompassing the screen display, etc.

Figure 3:
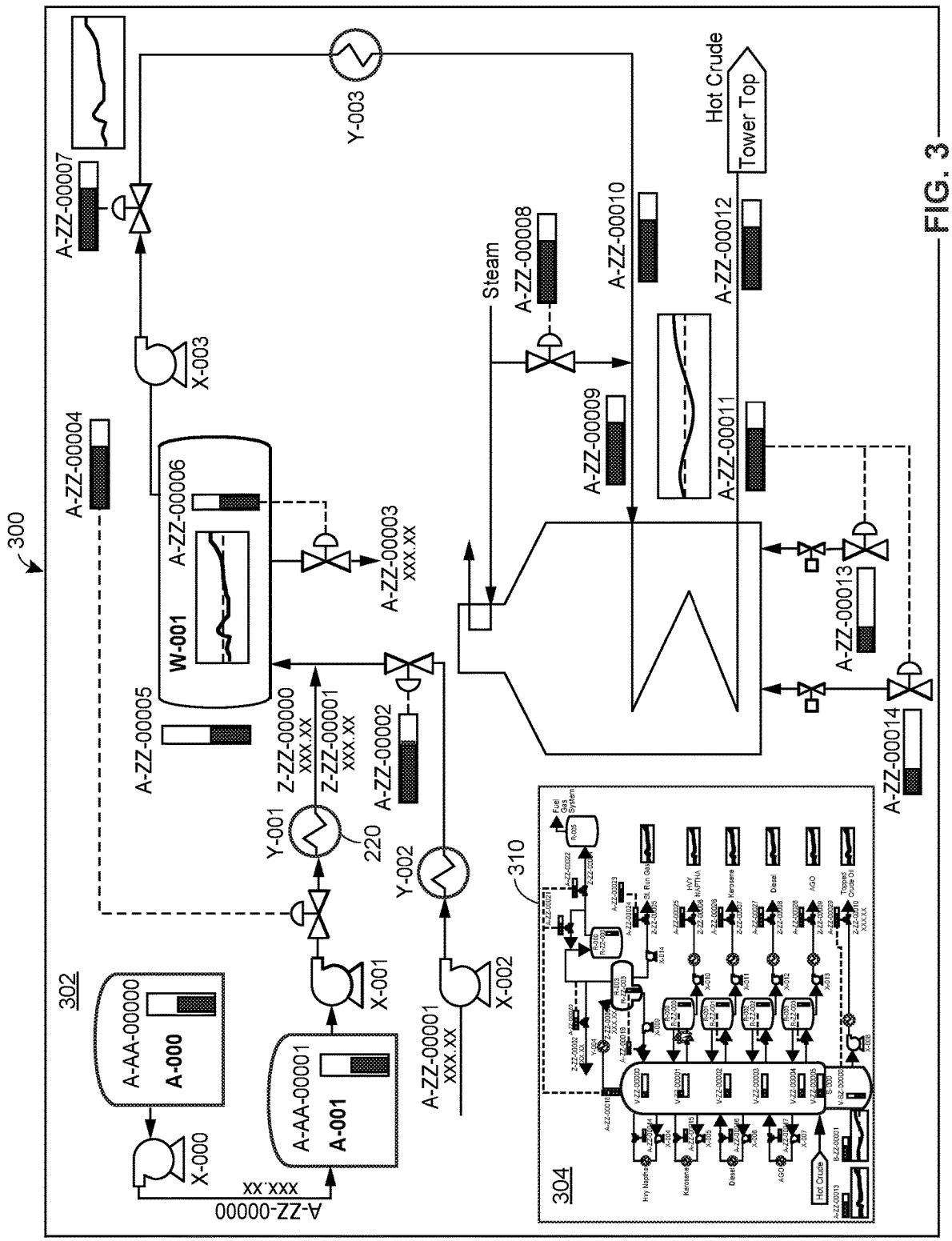
FIG. 3 is a screen display in a preview mode depicting the process section and a window overlaying the process section and including the other process section.

FIG. 3 illustrates an example screen display 300 in a preview mode depicting a viewed process section 302 and a window 310 overlaying the viewed process section 302 and including a previewed process section 304 which presents live data from the process plant 10. The viewed and previewed process sections 302, 304 may be the viewed and previewed process sections 202, 262 presented in FIGS. 2A-2D or may be any other process sections. In some embodiments, the UI device 112 and more specifically the control unit 44 may select an empty portion of screen display 300 for placing the window 310 so as not to obscure any process plant entities, process parameters, alarms, off-sheet connectors, etc., on the viewed process section 302.

For example, the control unit 44 may determine the size of the area for the window 310. Then the control unit 44 may locate an area on the screen display 300 which meets the size requirements for the window 310 and does not include any process plant entities, process parameters, alarms, off-sheet connectors, etc. If the screen display 300 does not include empty space which meets the size requirements for the window 310, the control unit 44 may scale down the viewed process section 302 until there is enough empty space to place the window 310. In another example, process plant entities, process parameters, alarms, off-sheet connectors, etc., for the viewed process section 302 may be prioritized in a similar manner as described above. The window 310 may be placed over the process plant entities, process parameters, alarms, off-sheet connectors, etc., which are ranked below a threshold ranking obscuring those objects. In other embodiments, the server 150 may identify a location for placing the window 310 within the screen display 300.

In any event, the control unit 44 may present the previewed process section 304 within the window 310. In some embodiments, a portion of the previewed process section 304 may be displayed to fit within the window 310. In other embodiments, the previewed process section 304 may be scaled down to fit within the window. For example, the previewed process section 304 may be scaled down according to the ratio between the size of the window 310 and the size of the screen display 300. More specifically, if the window 310 is one-sixth the size of the screen display 300, the previewed process section 304 may be scaled down by five-sixths.

In yet other embodiments, process plant entities, process parameters, alarms, off-sheet connectors, etc., for the previewed process section 304 may be prioritized in a similar manner as described above. The process plant entities, process parameters, alarms, off-sheet connectors, etc., which are ranked above a threshold ranking may not be scaled down whereas the rest of the process plant entities, process parameters, alarms, off-sheet connectors, etc., may be scaled down. In another example, only the process plant entities, process parameters, alarms, off-sheet connectors, etc., which are ranked above a threshold ranking and/or priority level may be included in the window 310. The threshold ranking and/or priority level may be determined in accordance with the size of the window 310. As the size of the window 310 increases more process plant entities, process parameters, alarms, off-sheet connectors, etc., may fit within the window 310, and as a result the threshold ranking and/or priority level may be lower.

While the screen display 300 includes one window 310 which displays one previewed process section 304, this is merely for ease of illustration only. Any number of windows 310 may display any number of previewed process sections. For example, the screen display 300 may include two windows which display previews for the upstream and downstream process sections to the viewed process section 302. In another example, the screen display 300 may include four windows which display previews for each adjacent process section to the viewed process section 302 within the process plant 10.

Figure 4:
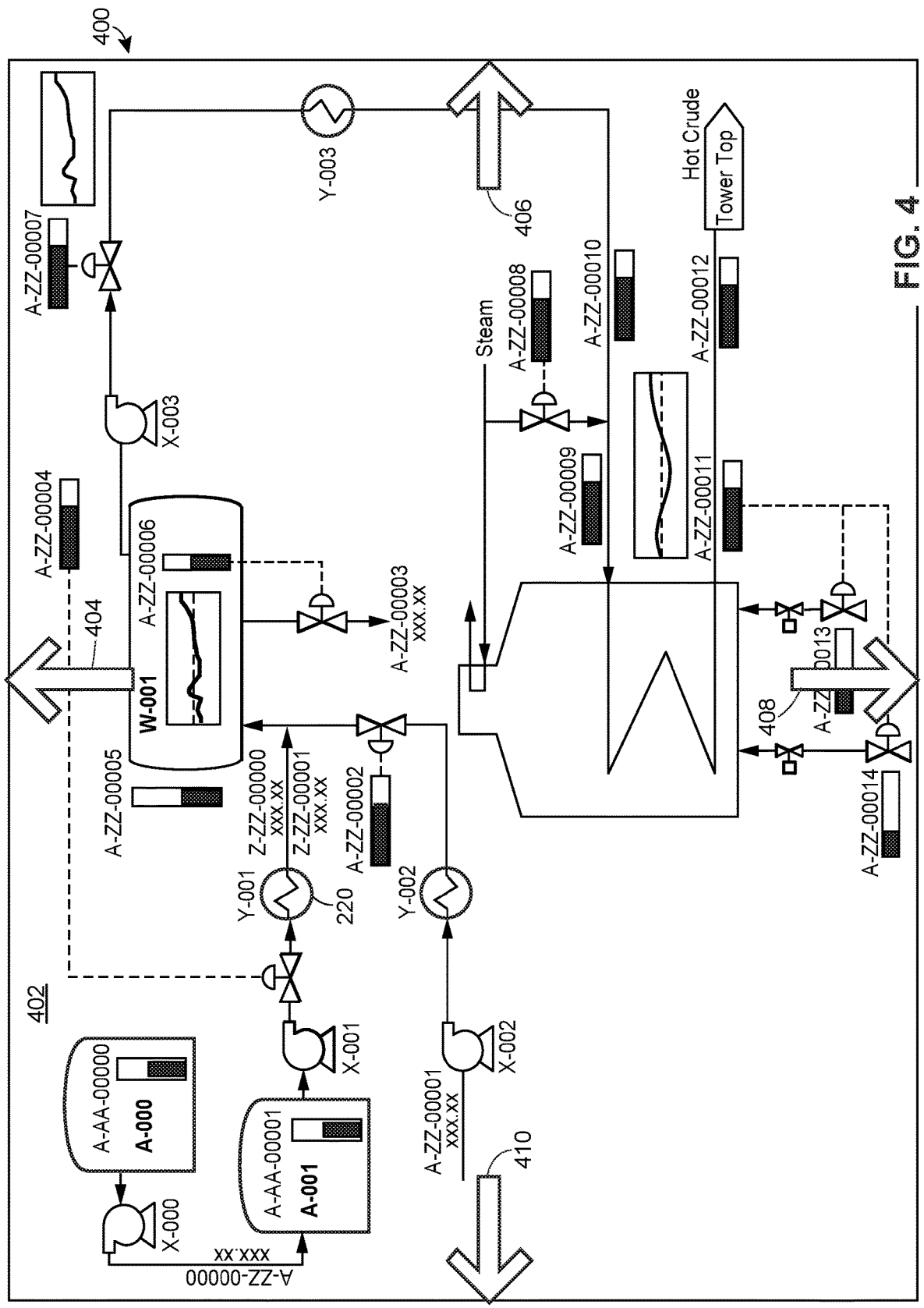
FIG. 4 is a screen display in a full view mode depicting the process section and user controls for viewing and/or previewing adjacent process sections in the process plant.

As mentioned above, an operator may select an off-sheet connector for a process section in the full view mode to view an upstream or downstream process section with the viewed process section in the preview mode. In addition to previewing upstream and downstream process sections to the viewed process section, the operator may preview adjacent process sections. FIG. 4 illustrates an example screen display 400 in a full view mode depicting a process section 402 and user controls 404-410 which, when selected, may cause the UI device 112 to present an adjacent process section corresponding to an adjacent portion of the process plant 10 in a full view mode or a preview mode.

For example, if a user input is received at one of the user controls 404-410, such as a double tap, a double click of a mouse, a tap and hold, a click and hold, etc., the UI device 112 may display an adjacent process section in a full view mode. If an alternate user input is received at one of the user controls 404-410, such as a tap, a single click, a slide, a click and drag, a mouse hover, etc., the UI device 112 may display an adjacent process section in a preview mode, as described above in FIGS. 2B, 2C, and 3.

More specifically, the UI device 112 may select one of the adjacent process sections to the viewed process section 402 for display based on the orientation and/or position of the selected user control 404-410. If the selected user control points to the left, the UI device 112 may display the adjacent process section to the left of the viewed process section 402. Also, if the selected user control is located in the left portion of the viewed process section 402, the UI device 112 may display the adjacent process section to the left of the viewed process section 402.

For example, if the user input is received at user control 404, the UI device 112 may display the process section neighboring the viewed process section 402 from above in the full view mode. If the alternate user input is received at user control 404, the UI device 112 may display the process section neighboring the viewed process section 402 from above in the preview mode.

Additionally, if the user input is received at user control 406, the UI device 112 may display the process section neighboring the viewed process section 402 to the right in the full view mode. If the alternate user input is received at user control 406, the UI device 112 may display the process section neighboring the viewed process section 402 to the right in the preview mode.

Further, if the user input is received at user control 408, the UI device 112 may display the process section neighboring the viewed process section 402 from below in the full view mode. If the alternate user input is received at user control 408, the UI device 112 may display the process section neighboring the viewed process section 402 from below in the preview mode.

Moreover, if the user input is received at user control 410, the UI device 112 may display the process section neighboring the viewed process section 402 to the left in the full view mode. If the alternate user input is received at user control 410, the UI device 112 may display the process section neighboring the viewed process section 402 to the left in the preview mode.

While the user controls 404-410 are represented as arrows in the screen display 400, this is merely one exemplary embodiment. The user controls 404-410 may not be visible on the screen display 400 or may be represented as circles, dots, or in any other suitable manner on the screen display 400.

Figure 5:
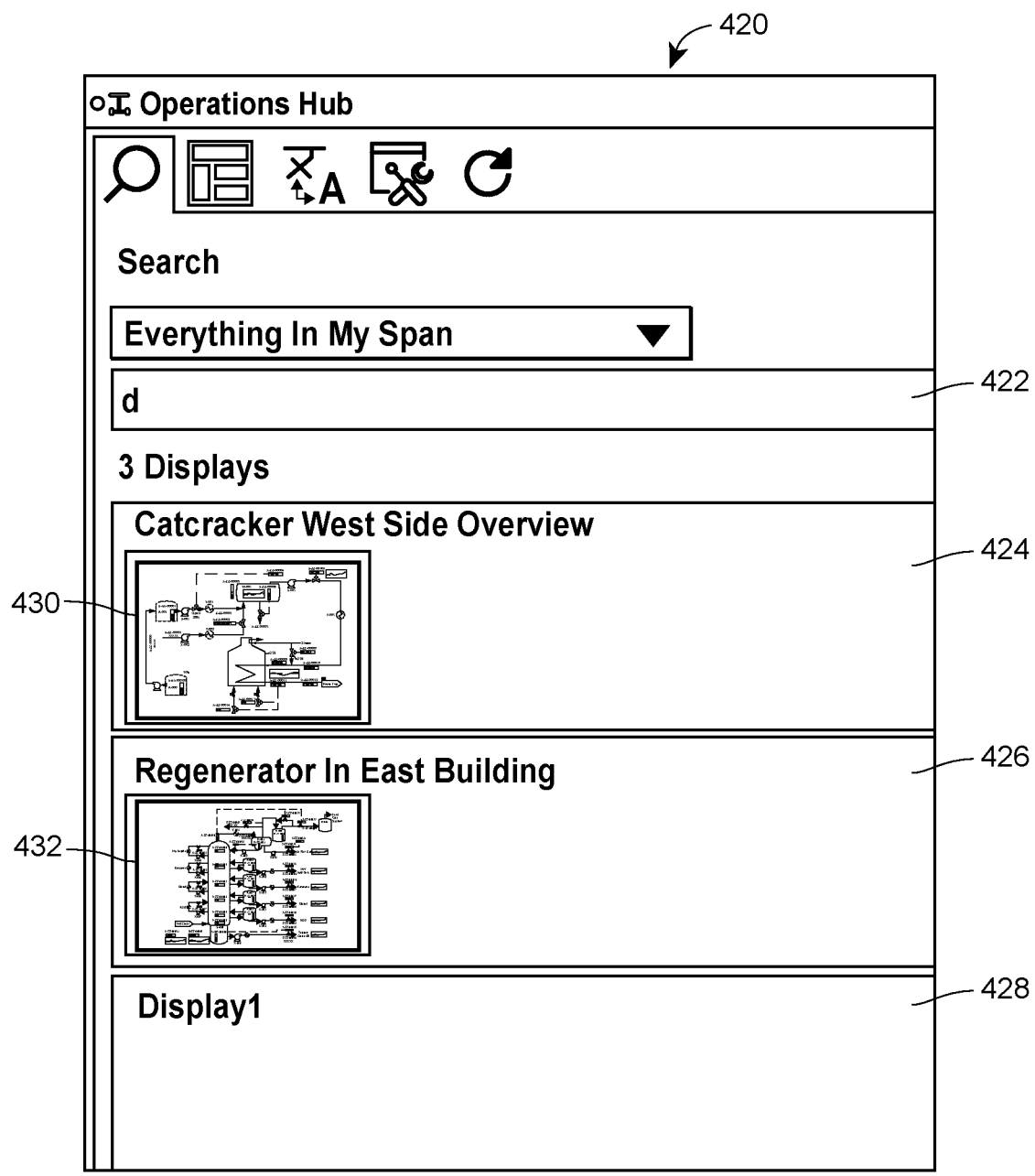
FIG. 5 is a partial screen display depicting a search display and search results including other process sections in the search results which may be presented in a window overlaying the process section.

FIG. 5 illustrates an example search window 420 which may overlay the viewed process section (not shown), and includes a search box 422 and search results 424-428, some or all of which include previewed process sections 430, 432 corresponding to the process sections in the search results. The viewed and previewed process sections may be the viewed and previewed process sections 202, 262 presented in FIGS. 2A-2D or may be any other process sections. In one embodiment, the previewed process sections 430, 432 may be of a scaled-down of, or lower resolution than, the previewed process sections 202, 262 and/or of a lower resolution than the viewed process section. For instance, the previewed process sections 430, 432 may show only the major components of the other process sections, leaving out some of the more minor details that would be shown in the full view of the other process sections. As an example, the full view section of FIG. 2D may be displayed as a preview section in the search results as an icon for the tower top and valves, but not the text, trend graphs, connection lines, etc.

For example, the control unit 44 may detect that a user is engaging in a search for another process section based on an entry of a query into the search box 422 (e.g., in response to a user double tap, a double click of a mouse, a tap and hold, a click and hold, typing, etc., in the search box 422). The control unit 44 may display results from the search under the search box 422 or in any other appropriate area of the display of the viewed area. For each search item 424-428 resulting from the search, the control unit 44 may scale down the previewed process section 430, 432, so as to fit in the search results 430, 432 in a manner that conveys the substance of the previewed process sections. In other embodiments, the server 150 may identify a location for placing the search results 424-428 with the screen display.

In any event, the control unit 44 may present the previewed process sections 430, 432 within the search results 424-428. As mentioned above, the previewed process sections 430, 432 may be scaled down to fit the search results, taking into account the number of search results (e.g., more search results causes further scaling down of the previewed process sections so as to present all search results on the display screen).

In yet other embodiments, process plant entities, process parameters, alarms, off-sheet connectors, etc. for the previewed process sections 430, 432, may be prioritized in a similar manner as described above. The process plant entities, process parameters, alarms, off-sheet connectors, etc. which are ranked above a threshold ranking may not be scaled down whereas the rest of the process plant entities, process parameters, alarms, off-sheet connectors, etc. may be scaled down. In another example, only the process plant entities, process parameters, alarms, off-sheet connectors, etc. which are ranked above a threshold ranking and/or priority level may be included in the search results 424-428. As fewer search results are displayed, process plant entities, process parameters, alarms, off-sheet connectors, etc. may fit within the previews 430, 432, and, as a result, the threshold ranking and/or priority level may be lower. In yet another example, a previewed process section having an alert or alarm may be highlighted as compared to the other search results, such as by having an animation, color, brightness, etc. different than the other search results so as to draw attention to it.

While the search window 420 includes one window and three search results 424-428, two of which include previews 430, 432, this is merely for ease of illustration only. Any number of windows 420 may display any number of search results and/or any number of previewed process sections. In another example, the search window 420 may include multiple windows which display search results individually or according to groupings such as common hierarchy or relevance.

Figure 6:
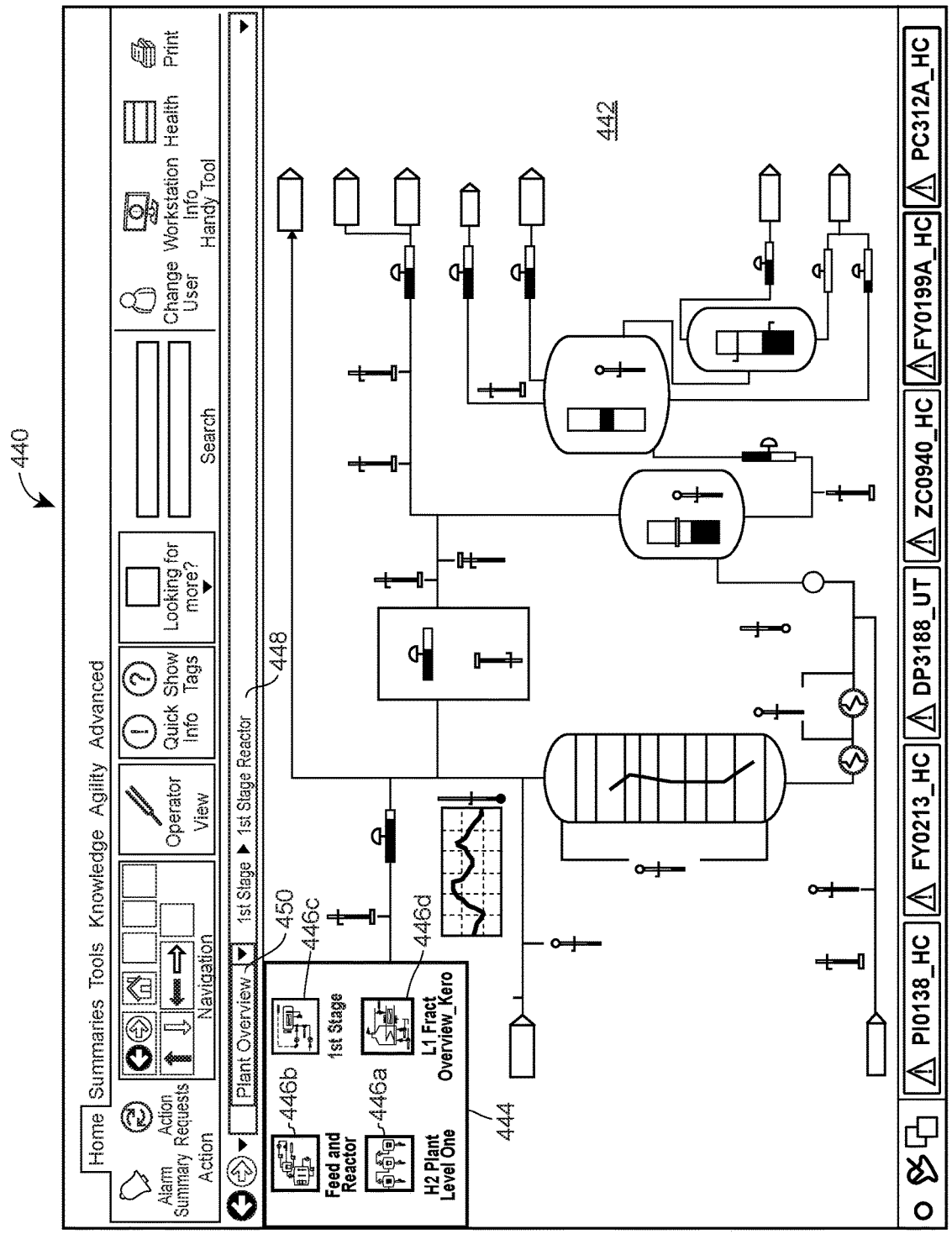
FIG. 6 is a screen display in a preview mode depicting the process section and a window overlaying the process section and including other process sections in a navigation trail of a hierarchy of the process section in relation to a hierarchical structure of the process control plant.

FIG. 6 illustrates an example screen display 440 in a preview mode depicting a viewed process section 442 and a window 444 overlaying the viewed process section 442 and including previewed process section 446a-446d which presents live data from the process plant 10. In this embodiment, the previewed process sections 446a-446d are presented as previews of "breadcrumbs" in a navigation bar 448. In particular, the navigation bar 448 depicts a navigation trail of a hierarchical structure of the process plant. For example, as seen in FIG. 6, the viewed process section 442 is of a "1$^{st}$ Stage Reactor." The navigation bar 448 shows that the navigation trail "breadcrumbs" includes "1$^{st}$ Stage" and "Plant Overview," each of which represents a process section at a higher level of hierarchy in the structure of the process plant 10. In response to receiving one type of user input at a breadcrumb 450 in the navigation bar 448, such as a hover, a double tap, a double click of a mouse, a tap and hold, a click and hold, etc., the UI device 112 may present the other process sections in a preview mode. For example, in response to hovering a cursor over the "Plant Overview" breadcrumb 450, the UI device 112 presents a preview 446a-446d of all process sections a lower level in the hierarchical structure of the plant 10, inclusive of a preview of the "1$^{st}$ Stage" process section 446a. Thus, a user may navigate to another process section that is not necessarily adjacent to the viewed process section 442, but within the hierarchical structure of the navigation trail that led to the viewed process section 442. In some embodiments, the UI device 112 and more specifically the control unit 44 may select an empty portion of screen display 440 for placing the window 444 so as not to obscure any process plant entities, process parameters, alarms, off-sheet connectors, etc., on the viewed process section 442. In another embodiment, the UI device 112 and control unit 44 may present the window 444 below the selected navigation "breadcrumb" and overlay parts of the viewed process section 442.

For example, the control unit 44 may determine the size of the area for the window 444. Then the control unit 44 may locate an area on the screen display 440 proximate the selected navigation "breadcrumb." If the preview process sections 446a-446d are too numerous for the window 444, the control unit 44 may scale down the preview process sections 446a-446d until there is enough empty space to place them all in the window 444. In another example, process plant entities, process parameters, alarms, off-sheet connectors, etc., for the previewed process sections 446a-446b may be prioritized in a similar manner as described above. In yet another example, a previewed process section 446a having an alert or alarm may be highlighted as compared to the other search results, such as by having an animation, color, brightness, etc. different than the other search results so as to draw attention to it.

In any event, the control unit 44 may present the previewed process sections 446a-446d within the window 444.

In some embodiments, a portion of the previewed process sections 446a-446d may be displayed to fit within the window 444. In other embodiments, the previewed process sections 446a-446d may be scaled down to fit within the window 444.

In yet other embodiments, process plant entities, process parameters, alarms, off-sheet connectors, etc., for the previewed process sections 446a-446d may be prioritized in a similar manner as described above. The process plant entities, process parameters, alarms, off-sheet connectors, etc., which are ranked above a threshold ranking may not be scaled down whereas the rest of the process plant entities, process parameters, alarms, off-sheet connectors, etc., may be scaled down. In another example, only the process plant entities, process parameters, alarms, off-sheet connectors, etc., which are ranked above a threshold ranking and/or priority level may be included in the window 444. The threshold ranking and/or priority level may be determined in accordance with the size of the window 444. As the size of the window 444 increases more process plant entities, process parameters, alarms, off-sheet connectors, etc., may fit within the window 444, and as a result the threshold ranking and/or priority level may be lower.

While the screen display 440 includes one window 444 which displays previewed process section 446a-446d for one navigation "breadcrumb," this is merely for ease of illustration only. Any number of windows 444 may display any number of previewed process sections. For example, the screen display 440 may include windows which display previews for the upstream hierarchical process sections of the viewed process section 442.

Figure 7:
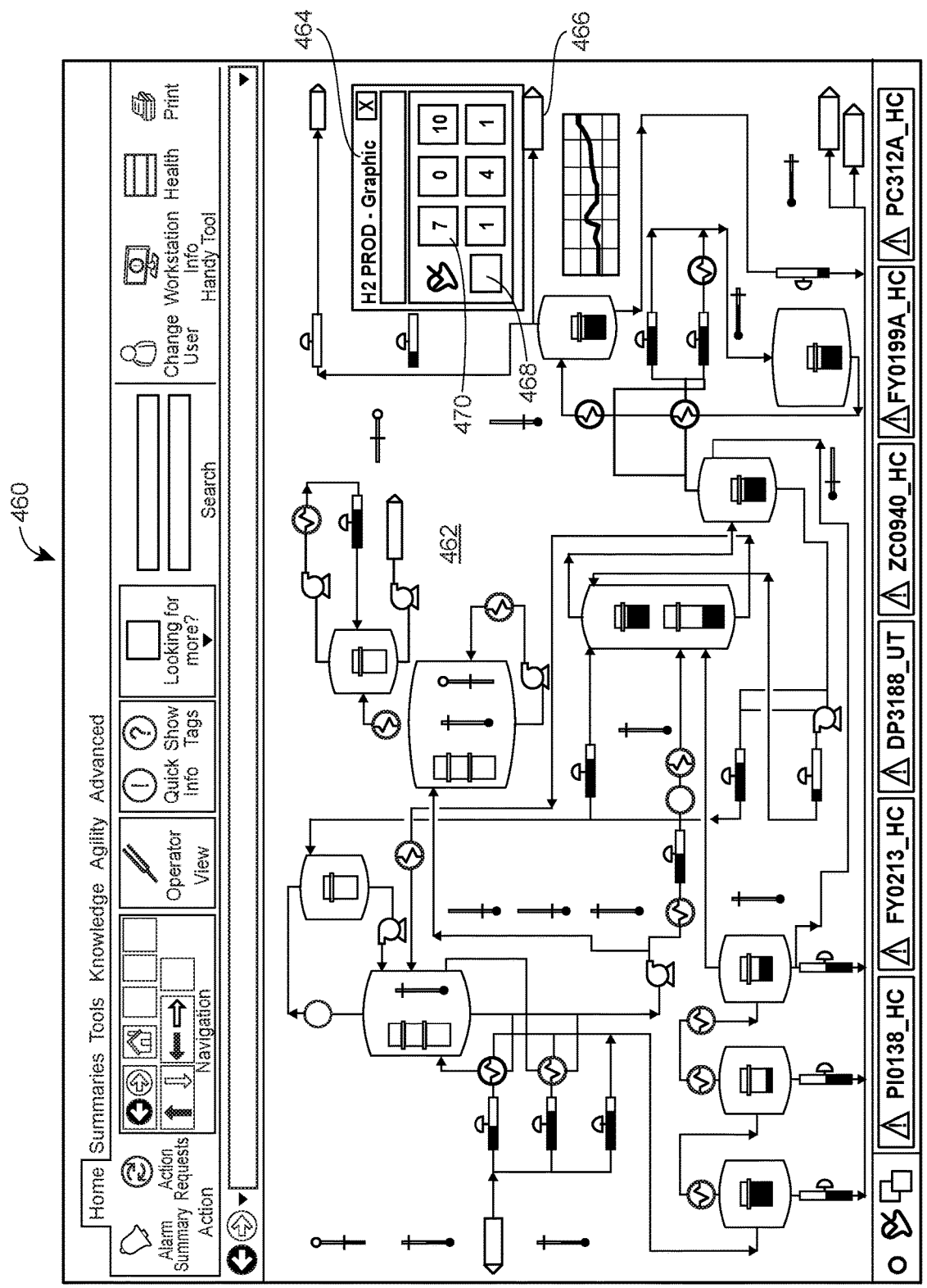
FIG. 7 is a screen display in a preview mode depicting the process section and a window overlaying the process section and including a status summary of the other process section.

FIG. 7 illustrates an example screen display 460 in a preview mode depicting a viewed process section 462 and a window 464 overlaying the viewed process section 462 which presents live data from the process plant 10. The off-sheet connector 466 includes an indication of a connection to another process section H2 PROD. In some embodiments, the off-sheet connector 466 may receive user input from the operator and based on the user input, the UI device 112 may display the H2 PROD process section in a full view mode or a preview mode. For example, if a user input is received at the off-sheet connector 466, such as a double tap, a double click of a mouse, a tap and hold, a click and hold, etc., the UI device 112 may display the H2 PROD process section in a full view mode, as described in more detail above with FIGS. 2A-2D. If an alternate user input is received at the off-sheet connector 466, such as a tap, a single click, a slide, a click and drag, a mouse hover, etc., the UI device 112 may display the status of the H2 PROD process section in a preview mode.

In some embodiments, the UI device 112 and more specifically the control unit 44 may select an empty portion of screen display 460 for placing the window 464 so as not to obscure any process plant entities, process parameters, alarms, off-sheet connectors, etc., on the viewed process section 462. In another embodiment, the UI device 112 and control unit 44 may present the window 464 proximate the selected off-sheet connector 466.

In this example, process section previews 468, alarms 470, alerts 472, etc., for the previewed process section status 464 may be prioritized in a similar manner as described above. In yet another example, a previewed process section status 464 having an alert 472 or alarm 470 may be highlighted as compared to the other search results, such as by having an animation, color, brightness, etc. different than the other search results so as to draw attention to it. The number of alerts, alarms, etc. may also be indicated.

In any event, the control unit 44 may present the previewed process section status within the window 464. In some embodiments, a portion of the previewed process section status, such as the process section preview 468, alarms 470, alerts 472, may be displayed to fit within the window 464. In other embodiments, the previewed process section status may be scaled down to fit within the window 464.

While the screen display 460 includes one window 464 which displays previewed process section statuses 468-472 for one off-sheet connector 466, this is merely for ease of illustration only. Any number of windows 464 may display any number of previewed process section statuses or previewed process sections.

Figure 8:
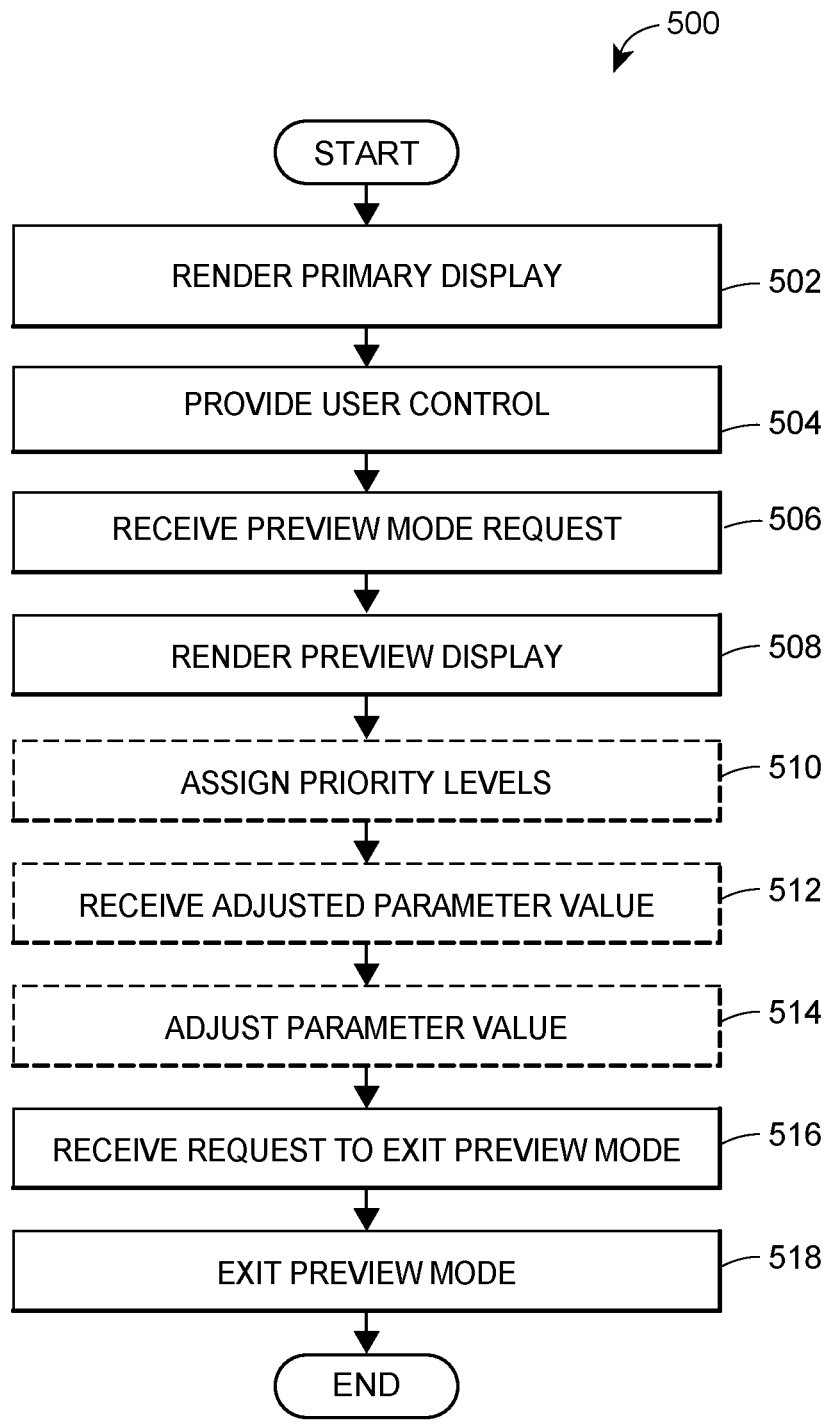
FIG. 8 is a flow diagram representing an exemplary method for previewing process sections in a process plant.

FIG. 8 depicts a flow diagram representing an exemplary method 500 for previewing process sections in a process plant. The method 500 may be executed on the UI device 112. In some embodiments, the method 500 may be implemented in a set of instructions stored on a non-transitory computer-readable memory and executable by one or more processors of the UI device 112. For example, the method 500 may be performed by the control unit 44 as shown in FIG. 1B.

At block 502, the UI device 112 may present (i.e., display or render) a process section depicting several process plant entities on a process plant display, such as the screen display 200 as shown in FIG. 2A. The process section may include graphic representations of process plant entities, connections between the process plant entities, process parameter values, and alarms. In some embodiments, the process parameter values may represent live data of actual measurements and set points within the on-line process plant.

Additionally, the UI device 112 may provide a user control for selecting another process section to view in a preview mode or a full view mode (block 504), such as the off-sheet connector 204, as shown in FIG. 2A. The user control may include an indication of a connection to another process section, such as "Tower Top." In response to receiving one type of user input at the user control, such as a double tap, a double click of a mouse, a tap and hold, a click and hold, etc., the UI device 112 may present the other process section in a full view mode. In response to receiving another type of user input at the user control, such as a tap, a single click, a slide, a click and drag, a mouse hover, etc., the UI device 112 may present the other process section in a preview mode.

At block 506, the UI device 112 may receive user input (such as a tap, a single click, a slide, a click and drag, a mouse hover, etc.) indicating a request to display the other process section in a preview mode. Accordingly, the UI device 112 may present (e.g., render) the process section ("viewed process section") and the other process section ("previewed process section") in a preview mode on the process plant display (block 508), such as the screen display 260 as shown in FIG. 2B. The process sections may be presented side-by-side with an intersection between the process sections, such as the intersection 284 as shown in FIG. 2B. In other embodiments, the process sections or process section status may be displayed in separate windows. For example, the previewed process section or status of the previewed process section may be displayed in a window overlaying the viewed process section, such as in the screen display 300 as shown in FIG. 3, the screen display ### as shown in FIG. 6 or the screen display ### as shown in FIG. 7. In some embodiments, the window containing the previewed process section or previewed process section status may be smaller than the window containing the viewed process section. Additionally, the window containing the previewed process section or previewed process section status may be placed so as not to obscure any process plant entities, process parameters, alarms, off-sheet connectors, etc., on the viewed process section.

In an addition embodiment, the user input indicating a request to display another process section in a preview mode at block 506 may be received in the form of a request for a search. For example, a user may search for another process section, and a resulting list of search results may each include a preview of the process sections in the search results. Accordingly, the UI device 112 may present (e.g., render) one or more process section ("viewed process section") and the other process section(s) ("previewed process section(s)") in a preview mode on the process plant display (block 508), such as the search display 420 as shown in FIG. 5.

Optionally (e.g., in some embodiments), each of the process sections may be assigned a priority level (block 510). For example, the previewed process section may be assigned a higher priority level than the viewed process section as in the screen display shown in FIG. 6, the viewed process section may be assigned a higher priority level than the previewed process section, the operator may select one of the process sections which may be assigned a higher priority level, or the priority levels may be assigned in any other suitable manner. In yet another example, a summary of alerts, alarms, etc. may be displayed as a status of previewed process section as in the screen display shown in FIG. 7. In any event, process parameter values may be adjustable for the process section assigned a higher priority level, while process parameter values may not be adjustable for the other process section. In other embodiments, process parameter values may not be adjustable for either process section in the preview mode or may be adjustable for both process sections in the preview mode.

Also optionally (e.g., in embodiments where process parameter values are adjustable), at block 512, the UI device 112 may receive user input indicating a request to adjust a process parameter value for a process section which is adjustable in the preview mode. For example, the operator may perform various touch gestures or mouse clicks on a graphic representation of a process plant entity in the process section to adjust a process parameter value for the process plant entity. More specifically, the operator may perform a drag gesture or a click and drag to adjust a tank level value for a tank or a temperature setting for a heat exchanger, may perform a rotate gesture to adjust the speed of a pump, may perform pinch and spread gestures to adjust the valve opening percentage of a valve, may type in a new or adjusted process parameter value, etc.

In response to receiving the user input, the UI device 112 and more specifically, the control unit 44 may adjust the process parameter value during on-line operation of the process plant (block 514). For example, the control unit 14 may provide instructions to the controllers 11 as shown in FIG. 1A to adjust the process parameter value in the process plant. In another example, the control unit 44 may communicate the adjusted process parameter value to the server 150 as shown in FIG. 1A which may provide instructions to the controllers 11 to adjust the process parameter value in the process plant. The controllers 11 may in turn, communicate with the field devices 15-22, 40-46 as shown in FIG. 1A to adjust the process parameter value in the process plant.

At block 516, the UI device 112 may receive user input indicating a request to exit preview mode and to display the viewed process section or the previewed process section in the full view mode. For example, the operator may select one of the process sections to display in the full view mode by tapping, clicking, double tapping, double clicking, etc., on the portion of the process plant display that corresponds to the desired process section for display in the full view mode. For example, if the operator wants to display the previewed process section in the full view mode, the operator may double tap or double click on portion of the process plant display that includes the previewed process section.

Then, at block 518, the selected process section may then be displayed in the full view mode on the process plant display, and to exit preview mode, such as the screen display 290 as shown in FIG. 2D. The full view mode may include the entire process section on the process plant display rather than a portion or scaled down version of the process section, as in the preview mode described above.

Embodiments of the techniques described in the present disclosure may include any number of the following aspects, either alone or combination:

A method for viewing a process section in a process plant while simultaneously viewing a previous of another process section, the method comprising: presenting, by one or more processors on a process plant display, a process section depicting a portion of a process plant including graphic representations of a plurality of process plant entities within the process plant; providing, by the one or more processors on the process plant display, a navigation tool to navigate to another portion of the process plant; receiving, at the one or more processors via the navigation tool, an indication to navigate to another portion of the process plant; and presenting, by the one or more processors on the process plant display, at least a portion of the process section while simultaneously presenting a preview of one or more other process sections in response to the indication to navigate to another portion of the process plant.

2. The method according to aspect 1, wherein the navigation tool comprises a navigational bar depicting a navigation trail of a hierarchy of the portion of the process plant in relation to a structure of the process control plant.

3. The method according to any one of the preceding aspects, wherein the indication to navigate to another portion of the process plant comprises an indication to navigate to a different level of hierarchy in the navigation trail, and wherein presenting the preview of one or more other process sections in response to the indication to navigate comprises presenting, by the one or more processors on the process plant display, a preview of one or more other process sections at the different level of hierarchy.

4. The method according to any one of the preceding aspects, wherein the indication to navigate comprises a graphical intersection of a selection tool with the navigational tool.

5. The method according to any one of the preceding aspects, wherein the indication to navigate comprises placing the selection tool over a graphical depiction of the navigation tool for a threshold amount of time.

6. The method according to any one of the preceding aspects, wherein the indication to navigate comprises a selection of the navigation tool with the selection tool.

7. The method according to any one of the preceding aspects, wherein the navigation tool comprises a list of one or more items, each item corresponding to another portion of the process plant and each item comprising a preview of the corresponding other portion of the process plant.

8. The method according to any one of the preceding aspects, wherein the navigation tool comprises a search tool that returns result items in response to the indication to navigate, each result item corresponding to another portion of the process plant and each result item comprising a preview of the corresponding other portion of the process plant.

9. The method according to any one of the preceding aspects, wherein presenting at least a portion of the process section comprises presenting, by the one or more processors on the process plant display, a preview of the one or more other process sections in a lower resolution than the resolution of the portion of the process section.

10. The method according to any one of the preceding aspects, wherein presenting at least a portion of the process section comprises presenting, by the one or more processors on the process plant display, a preview of an alert within at least one of the one or more other process sections.

11. The method according to any one of the preceding aspects, further comprising: upon presenting the preview of the one or more other process sections on the process plant display, receiving, at the one or more processors via the navigation tool, input from a user requesting a full view of one of the one or more other process sections; and presenting, by the one or more processors on the process plant display, the full view of the requested other process section including not presenting the process section.

12. A user interface device for viewing a process section in a process plant while simultaneously viewing a previous of another process section, the user interface device including: a display screen; one or more processors coupled to the display screen; and a non-transitory computer-readable medium coupled to the one or more processors and storing instructions thereon, that when executed by the one or more processors, cause the user interface device to: presenting, via the display screen, a process section depicting a portion of a process plant including graphic representations of a plurality of process plant entities within the process plant; provide a navigation tool to navigate to another portion of the process plant; receive, via the navigation tool, an indication to navigate to another portion of the process plant; and present, via the display screen, at least a portion of the process section while simultaneously presenting a preview of one or more other process sections in response to the indication to navigate to another portion of the process plant.

13. The user interface device according to aspect 12, wherein the navigation tool comprises a navigational bar depicting a navigation trail of a hierarchy of the portion of the process plant in relation to a structure of the process control plant.

14. The user interface device according to either one of aspect 12 or aspect 13, wherein the indication to navigate to another portion of the process plant comprises an indication to navigate to a different level of hierarchy in the navigation trail, and wherein the instructions further cause the user interface device to present the preview of one or more other process sections in response to the indication to navigate comprise wherein the instructions further cause the user interface device to present, via the display screen, a preview of one or more other process sections at the different level of hierarchy.

15. The user interface device according to any one of aspects 12-14, wherein the indication to navigate comprises a graphical intersection of a selection tool with the navigational tool.

16. The user interface device according to any one of aspects 12-15, wherein the indication to navigate comprises a placement of the selection tool over a graphical depiction of the navigation tool for a threshold amount of time.

17. The user interface device according to any one of aspects 12-16, wherein the indication to navigate comprises a selection of the navigation tool with the selection tool.

18. The user interface device according to any one of aspects 12-17, wherein the navigation tool comprises a list of one or more items, each item corresponding to another portion of the process plant and each item comprising a preview of the corresponding other portion of the process plant.

19. The user interface device according to any one of aspects 12-18, wherein the navigation tool comprises a search tool that returns result items in response to the indication to navigate, each result item corresponding to another portion of the process plant and each result item comprising a preview of the corresponding other portion of the process plant.

20. The user interface device according to any one of aspects 12-19, wherein the instructions further cause the user interface device to present, via the display screen, a preview of the one or more other process sections in a lower resolution than the resolution of the portion of the process section.

21. The user interface device according to any one of aspects 12-20, wherein the instructions further cause the user interface device to present, via the display screen, a preview of an alert within at least one of the one or more other process sections.

22. The user interface device according to any one of aspects 12-21, wherein the instructions further cause the user interface device to: upon presenting the preview of the one or more other process sections via the display screen, receive input from a user requesting a full view of one of the one or more other process sections; and present, via the display screen, the full view of the requested other process section including not presenting the process section.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1B. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method for viewing a first process section in a process plant while simultaneously viewing a preview of a second process section having at least one process parameter that is adjustable via the preview of the second process section, wherein the second process section is a different portion of the process plant with respect to the first process section, the method comprising:
presenting, by one or more processors on a process plant display, the first process section depicting a first portion of a process plant including a graphic representation of one or more process plant entities within the first process section, wherein at least one process parameter within the first process section is adjustable, via one or more of touch gestures or mouse clicks, each of the one or more touch gestures or mouse clicks being on the graphic representation of the one or more process plant entities within the first process section;
providing, by the one or more processors on the process plant display, a navigation tool to navigate to the second process section of the process plant, wherein the navigation tool further includes an indication to navigate and a selection to navigate;
receiving, at the one or more processors via the navigation tool, an indication to navigate to the second process section of the process plant, wherein the second process section of the process plant is not depicted in the process plant display before the indication is received; and
presenting, by the one or more processors on the process plant display, at least a portion of the first process section while simultaneously presenting a preview of one or more portions of the second process section, the preview including a graphic representation of one or more process plant entities from the second process section, in response to the indication to navigate to the second process section of the process plant, wherein at least one process parameter within the preview of the one or more portions of the second process section is adjustable, via one or more of touch gestures or mouse clicks, each of the one or more touch gestures or mouse clicks being on the graphic representation of the one or more process plant entities from the second process section, of the preview of the one or more portions of the second process section, while the preview of one or more portions of the second process section is simultaneously presented with the at least the portion of the first process section, wherein the indication to navigate comprises a graphical intersection of a selection tool with the navigation tool, wherein the indication to navigate comprises a placement of the selection tool over a graphical depiction of the navigation tool for a threshold amount of time, and wherein selection of the selection to navigate causes the process plant display to display the one or more portions of the second process section and not display the first process section.

2. The method of claim 1, wherein the navigation tool comprises a navigational bar depicting a navigation trail of a hierarchy of the portion of the process plant in relation to a structure of the process plant.

3. The method of claim 2, wherein the indication to navigate to the second process section of the process plant comprises an indication to navigate to a different level of hierarchy in the navigation trail, and wherein presenting the preview of one or more other process sections in response to the indication to navigate comprises presenting, by the one or more processors on the process plant display, a preview of one or more other process sections at the different level of hierarchy.

4. The method of claim 1, wherein the navigation tool comprises a list of one or more items, each item corresponding to another portion of the process plant and each item comprising a preview of the corresponding other portion of the process plant.

5. The method of claim 1, wherein the navigation tool comprises a search tool that returns result items in response to the indication to navigate, each result item corresponding to another portion of the process plant and each result item comprising a preview of the corresponding other portion of the process plant.

6. The method of claim 1, wherein presenting at least a portion of the first process section comprises presenting, by the one or more processors on the process plant display, a preview of the second process section in a lower resolution than the resolution of the portion of the first process section.

7. The method of claim 1, wherein presenting at least a portion of the first process section comprises presenting, by the one or more processors on the process plant display, a preview of an alert within the second process section.

8. The method of claim 1, further comprising:
upon presenting the preview of the second process section on the process plant display, receiving, at the one or more processors via the navigation tool, input from a user requesting a full view of one of the second process section; and
presenting, by the one or more processors on the process plant display, responsive to the input from the user, the full view of the second process section including not presenting the first process section.

9. A user interface device for viewing a first process section in a process plant while simultaneously viewing a preview of a second process section having at least one process parameter that is adjustable via the preview of the second process section, wherein the second process section is a different portion of the process plant with respect to the first process section, the user interface device including:
a display screen;
one or more processors coupled to the display screen; and
a non-transitory computer-readable medium coupled to the one or more processors and storing instructions thereon, that when executed by the one or more processors, cause the user interface device to:
present, via the display screen, the first process section depicting a first portion of the process plant including a graphic representation of one or more process plant entities within the first process section, wherein at least one process parameter within the first process section is adjustable, via one or more of touch gestures or mouse clicks, each of the one or more touch gestures or mouse clicks being on the graphic representation of the one or more process plant entities within the first process section;

provide a navigation tool to navigate to the second process section of the process plant, wherein the navigation tool further includes an indication to navigate and a selection to navigate;

receive, via the navigation tool, the indication to navigate to the second process section of the process plant, wherein the second process section of the process plant is not depicted in the display screen before the indication is received; and present, via the display screen, at least a portion of the first process section while simultaneously presenting a preview of one or more portions of the second process section, the preview including a graphic representation of one or more process plant entities from the second process section, in response to the indication to navigate to the second process section of the process plant, wherein the at least one process parameter within the preview of the one or more portions of the second process section is adjustable, via one or more of touch gestures or mouse clicks, each of the one or more touch gestures or mouse clicks being on the graphic representation of the one or more process plant entities from the second process section, of the preview of the one or more portions of the second process section, while the preview of one or more portions of the second process section is simultaneously presented with the at least the portion of the first process section, wherein the indication to navigate comprises a graphical intersection of a selection tool with the navigation tool, wherein the indication to navigate comprises a placement of the selection tool over a graphical depiction of the navigation tool for a threshold amount of time, and wherein selection of the selection to navigate causes the display screen to display the one or more portions of the second process section and not display the first process section.

10. The user interface device of claim 9, wherein the navigation tool comprises a navigational bar depicting a navigation trail of a hierarchy of the portion of the process plant in relation to a structure of the process plant.

11. The user interface device of claim 10, wherein the indication to navigate to the second process section of the process plant comprises an indication to navigate to a different level of hierarchy in the navigation trail, and wherein the instructions further cause the user interface device to present the preview of one or more other process sections in response to the indication to navigate comprise wherein the instructions further cause the user interface device to present, via the display screen, a preview of one or more other process sections at the different level of hierarchy.

12. The user interface device of claim 10, wherein the navigation tool comprises a list of one or more items, each item corresponding to another portion of the process plant and each item comprising a preview of the corresponding other portion of the process plant.

13. The user interface device of claim 10, wherein the navigation tool comprises a search tool that returns result items in response to the indication to navigate, each result item corresponding to another portion of the process plant and each result item comprising a preview of the corresponding other portion of the process plant.

14. The user interface device of claim 10, wherein the instructions further cause the user interface device to present, via the display screen, a preview of the second process section in a lower resolution than a resolution of the portion of the first process section.

15. The user interface device of claim 10, wherein the instructions further cause the user interface device to present, via the display screen, a preview of an alert within the second process section.

16. The user interface device of claim 10, wherein the instructions further cause the user interface device to:

upon presenting the preview of the second process section via the display screen, receive input from a user requesting a full view of one of the one or more other process sections; and present, via the display screen, responsive to the input from the user, the full view of the requested other process section including not presenting the process section.

\* \* \* \* \*